Jan. 6, 1959 J. F. L. WEBER 2,867,550
METHOD OF MAKING SELENIUM RECTIFIERS
AND ARTICLE PRODUCED THEREBY
Filed Feb. 19, 1954
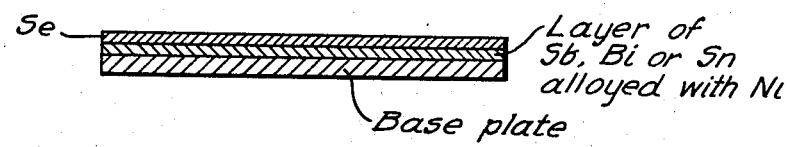
Se — Layer of Sb, Bi or Sn alloyed with Ni
Base plate
INVENTOR
J. F. L. WEBER
BY
ATTORNEY

2,867,550

Patented Jan. 6, 1959

2,867,550

METHOD OF MAKING SELENIUM RECTIFIERS AND ARTICLE PRODUCED THEREBY

Joachim F. L. Weber, Nurnberg, Germany, assignor to International Standard Electric Corporation, New York, N. Y., a corporation of Delaware Application February 19, 1954, Serial No. 411,539

Claims priority, application Germany February 27, 1953

7 Claims. (Cl. 117—200)

The invention relates to a method of producing selenium rectifiers, and particularly to an improved barrier-free zone between the base plate and the layer of selenium.

Selenium rectifiers are composed of a base plate, a layer of selenium on the base plate, and a counter electrode on the layer of selenium. It is desirable that no barrier layer be formed between the base plate and the selenium because such a barrier layer would at least partially cancel the effect of the barrier layer between the selenium and the counter electrode.

Various arrangements have been hitherto employed to provide a barrier-free transition between the base plate and the selenium. It is known practice, for instance, to produce a partially barrier-free transition by the insertion of different intermediate layers between the base plate and the selenium. Thus, for instance, intermediate layers of carbon or metal, such as tin, antimony, bismuth, nickel, etc. were formed on the base plate prior to the application of the selenium to the base plate. These intermediate layers, to a certain extent served to prevent the formation of a barrier layer between the base plate and the selenium.

This invention relates to the improvement of such intermediate layers.

In accordance with the invention there is added to the metal of the intermediate layer, for which tin, bismuth or antimony is used, a small percentage of nickel. Surprisingly, by means of such an addition the voltage drop of the rectifier plate in the direction of flux is considerably reduced as compared with the voltage drop of a plate employing an intermediate layer of a pure metal. When appropriately dosing the addition of nickel, the voltage drop in the direction of flux can be reduced to 10 percent of its original value.

The amount of nickel which is added to the metal of the intermediate layer ranges between the limits of 0.1-2 percent. Optimum values will be obtained when dosing an intermediate layer containing 2 to 5 times $10^{-4}$ g./cm.$^2$ of metal, with nickel so that the layer will exhibit $10^{-7}$ g. Ni/cm.$^2$. This means that very good results are obtained even if only a very small amount of nickel, like 0.2 to 0.5 percent is used.

The addition of nickel in the metallic intermediate layer may be effected for instance, by evaporating an alloy containing a small percentage of nickel onto the base plate. However, attention must be paid to the fact that the temperature causing the vaporization should be at least 900-1400° C., because otherwise only the metal of the intermediate layer will evaporate and the nickel, either all of it or the greatest part, will remain in the vaporization crucible. Furthermore care must be taken that no metal is used in the crucible which would readily alloy with nickel.

Furthermore it is feasible to deposit the metal of the intermediate layer and the nickel onto the base plate out of separate vaporization crucibles arranged, for example, next to each other. Another process for performing the precipitation of the nickel-containing metal for the intermediate layer is to arrange heating spirals next to the vaporization crucible for the metal of the intermediate layer. These heating spirals consist of nickel-containing alloys. The temperature of these heating spirals should be selected to evaporate a slight amount of nickel from the material of the spirals which is precipitated, together with the metal of the intermediate layer, on the base plate.

Experience has further shown that it is not essential to deposit the nickel additive simultaneously with the metal of the intermediate layer onto the base plate. It is possible to first deposit in any suitable way a thin layer of nickel onto the base plate, and thereafter a further layer of metal, in particular one of tin, bismuth or antimony. The second layer should not be too thick, so that when the processed base plates are heated, a diffusion of the nickel into the applied layer of metal can be produced.

Further advantages may be readily achieved by employing a radioactive metal, such as radioactive bismuth, as the metal for the intermediate layer.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A process of manufacturing selenium rectifiers comprising producing an intermediate layer on a base plate before applying the selenium, the layer comprising a metal selected from the group consisting of antimony, bismuth and tin, with a slight quantity of nickel between 0.1 to 2 percent by weight.

2. A method according to claim 1, wherein said intermediate layer contains 2 to 5 times $10^{-4}$ g./cm.$^2$ of said metal, and $10^{-7}$ g./cm.$^2$ of nickel.

3. A method according to claim 1 and further comprising evaporating said intermediate layer t a temperature ranging from 900 to 1400° centigrade.

4. A method according to claim 1 in which said metal of the intermediate layer and said nickel are precipitated simultaneously onto the base plate from different vaporization crucibles.

5. A method according to claim 4, in which said nickel is vaporized off at heating spiral consisting of a nickel alloy.

6. A method as claimed in claim 1 in which said base plate is first coated with a thin layer of nickel and, then with a thin layer of one or more metals of the group consisting of antimony, bismuth and tin, and that said base plate is thereafter subjected to a tempering process of such duration and temperature causing diffusion of the nickel, so that an alloy will be formed with the metal or metals of said thin layer.

7. A selenium rectifier comprising a base plate, a layer of selenium, and an intermediate layer comprising a metal selected from the group consisting of antimony, bismuth and tin, alloyed with a quantity of nickel, the nickel being 0.1 to 2 percent by weight.

References Cited in the file of this patent

UNITED STATES PATENTS 2,412,692    Peters _____ Dec. 17, 1946